(12) United States Patent
Kurokawa (10) Patent No.: US 9,915,291 B2
(45) Date of Patent: Mar. 13, 2018

(54) TORQUE TRANSMISSION SHAFT HAVING UNIVERSAL JOINT YOKE AND METHOD OF MANUFACTURING THE SAME

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 95 days.

(21) Appl. No.: 14/900,845

(22) PCT Filed: Jun. 23, 2014

(86) PCT No.: PCT/JP2014/066579
§ 371 (c)(1),
(2) Date: Dec. 22, 2015

(87) PCT Pub. No.: WO2015/015952
PCT Pub. Date: Feb. 5, 2015

(65) Prior Publication Data
US 2016/0153499 A1    Jun. 2, 2016

(30) Foreign Application Priority Data

Jul. 30, 2013 (JP) .................................. 2013-157518
Mar. 13, 2014 (JP) .................................. 2014-050230

(51) Int. Cl.
*F16C 3/03* (2006.01)
*F16D 1/10* (2006.01)
(Continued)

(52) U.S. Cl.
CPC .............. *F16D 1/101* (2013.01); *B29C 43/16* (2013.01); *B29C 43/18* (2013.01); *B62D 1/16* (2013.01);
(Continued)

(58) Field of Classification Search
CPC ... Y10T 403/7035; B29C 43/16; B29C 43/18; B62D 1/16; B62D 1/20; B29L 2031/75;
(Continued)

(56) References Cited

U.S. PATENT DOCUMENTS

RE27,068 E * 2/1971 Groves ..................... F16D 3/06
464/162
5,836,823 A * 11/1998 Shellaberger ........... F16D 3/387
464/134 X
(Continued)

FOREIGN PATENT DOCUMENTS

EP           1637433 A1     3/2006
JP        2001-182736 A     7/2001
(Continued)

OTHER PUBLICATIONS

Office Action dated Mar. 29, 2016, issued by the European Patent Office in counterpart European Patent Application No. 14832831.3.
(Continued)

*Primary Examiner* — Gregory J Binda
(74) *Attorney, Agent, or Firm* — Sughrue Mion, PLLC (57) ABSTRACT

A rod-shaped element having an outer diameter, which is the same as an outer diameter of a completed rod part, has one axial end portion and the other axial end portion to which a base end portion of a bifurcated yoke is fixed. The one axial end portion is subject to plastic working for diametrically deforming an outer periphery of the one axial end portion. Thereby, the outer periphery of the one axial end portion is formed with a male spline part having a groove bottom diameter smaller than an outer diameter of a rod part and having a tooth tip diameter larger than the outer diameter of the rod part.

3 Claims, 11 Drawing Sheets (51) Int. Cl.
*F16D 3/38* (2006.01)
*B62D 1/16* (2006.01)
*B62D 1/20* (2006.01)
*B29C 43/16* (2006.01)
*B29C 43/18* (2006.01)
*F16D 1/08* (2006.01)
*F16D 3/223* (2011.01)
*B29L 31/00* (2006.01)

(52) U.S. Cl.
CPC .................. B62D 1/20 (2013.01); F16C 3/03 (2013.01); F16D 3/387 (2013.01); *B29L 2031/75* (2013.01); *F16C 2326/24* (2013.01); *F16D 1/0858* (2013.01); *F16D 2001/103* (2013.01); *F16D 2003/22326* (2013.01); *Y10T 403/7035* (2015.01)

(58) Field of Classification Search
CPC ........ F16C 3/03; F16C 3/387; F16C 2326/24; F16D 1/101; F16D 1/0858; F16D 2001/103; F16D 2003/22326
USPC ....... 464/16, 134, 135, 162; 72/46; 264/259; 403/359.6
See application file for complete search history.

(56) References Cited

U.S. PATENT DOCUMENTS

| | | | |
|---|---|---|---|
| 5,919,094 A | * | 7/1999 | Yaegashi ............... B21C 37/202 464/162 |
| 2008/0277934 A1 | | 11/2008 | Deriaz |
| 2015/0210309 A1 | | 7/2015 | Kurokawa |

FOREIGN PATENT DOCUMENTS

| | | |
|---|---|---|
| JP | 2009-097558 A | 5/2009 |
| JP | 2010-127295 A | 6/2010 |
| JP | 2011-085152 A | 4/2011 |
| JP | 2011-126487 A | 6/2011 |
| JP | 2011-241957 A | 12/2011 |
| JP | 2012-117560 A | 6/2012 |
| WO | 2005/121581 A1 | 12/2005 |
| WO | 2008/057060 A2 | 5/2008 |

OTHER PUBLICATIONS

International Search Report for PCT/JP2014/066579 dated Sep. 22, 2014 [PCT/ISA/210].

* cited by examiner

TORQUE TRANSMISSION SHAFT HAVING UNIVERSAL JOINT YOKE AND METHOD OF MANUFACTURING THE SAME

TECHNICAL FIELD

The present invention relates to a torque transmission shaft having a universal joint yoke for configuring an intermediate shaft which configures, for example, an automobile steering apparatus and is configured to transmit rotation of a steering shaft to an input shaft of a steering gear unit, and relates to a method of manufacturing the same.

BACKGROUND ART

Figure 11:
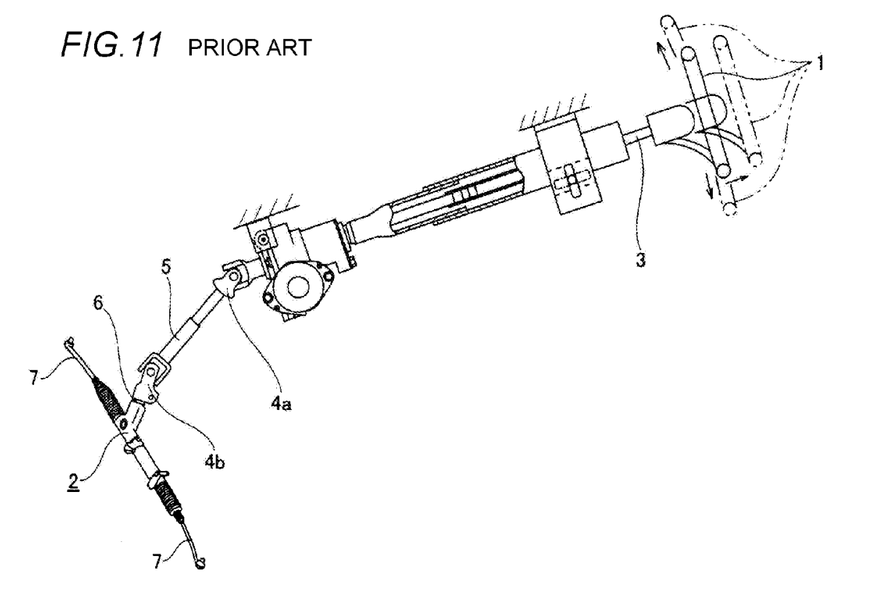
FIG. 11 is a partially cut side view illustrating one example of an automobile steering apparatus, in which an intermediate shaft including a torque transmission shaft having a universal joint yoke which is a subject of the present invention is incorporated.

A steering apparatus shown in FIG. 11, for example, has been conventionally used as an automobile steering apparatus. The steering apparatus is configured to convert rotational motion of a steering wheel 1 operated by a driver into linear motion at a steering gear unit 2, thereby applying a desired steering angle to left and right steering wheels (not shown). In order to implement this configuration, the steering wheel 1 is fixed to a rear end portion of a steering shaft 3. Also, a front end portion of the steering shaft 3 is coupled to a base end portion of an input shaft 6 of the steering gear unit 2 through a pair of universal joints 4a, 4b and an intermediate shaft 5. Also, a pair of tie rods 7, 7, which configure the steering gear unit 2 and are respectively coupled to the left and right steering wheels, are coupled at base end portions thereof to both end portions of a rack shaft, which has rack teeth meshed with pinion teeth provided at an intermediate part of the input shaft 6, through spherical joints.

In the steering apparatus configured as described above, when the driver operates the steering wheel 1, the rotation of the steering wheel 1 is transmitted to the input shaft 6 through the steering shaft 3, the universal joints 4a, 4b and the intermediate shaft 5. As a result, the rack shaft is displaced in a shaft direction (a width direction of a vehicle body) and the tie rods 7, 7 are thus pushed or pulled, so that the desired steering angle is applied to the left and right steering wheels.

The intermediate shaft 5 configuring the steering apparatus as described above is required to have not only a function of transmitting the torque between the universal joints 4a, 4b but also a function of expanding and contracting an entire length thereof due to one or both of following reasons (1) and (2).

(1) For the purpose of smoothly adjusting a position of the steering wheel 1 in a front-rear direction.

An interval between the universal joints 4a, 4b may be varied depending on position adjustment of the steering wheel 1 in a front-rear direction. In this case, in order to smoothly perform the position adjustment in the front-rear direction, it is necessary to configure the intermediate shaft 5 so that an entire length thereof can be smoothly (with small force) expanded and contracted.

(2) For the purpose of protecting a body of the driver at collision accident.

At collision accident, as an automobile primarily collides with another automobile and the like, the steering gear unit 2 is strongly pushed rearwards. If the movement of the steering gear unit 2 is transmitted to the steering shaft 3, as it is, the steering wheel 1 supported and fixed to the rear end portion of the steering shaft 3 is furiously displaced (pushed up) towards the body of the driver, so that it is difficult to protect the driver. Therefore, the intermediate shaft 5 is configured so that the entire length is contracted by shock load resulting from the primary collision. Thereby, the movement of the steering gear unit 2 resulting from the primary collision is not transmitted, as it is, to the steering shaft 3. Incidentally, in order to achieve this function, the load necessary to expand and contract the intermediate shaft 5 may be large to some extent.

Figure 12:
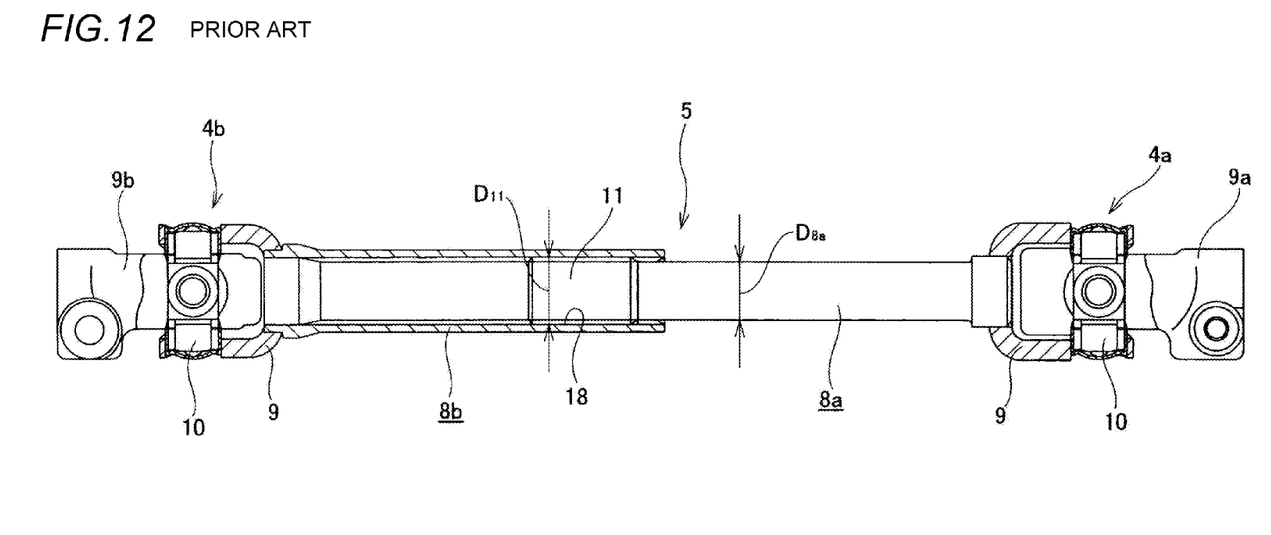
FIG. 12 is a cut side view illustrating the intermediate shaft.
Figure 13A:
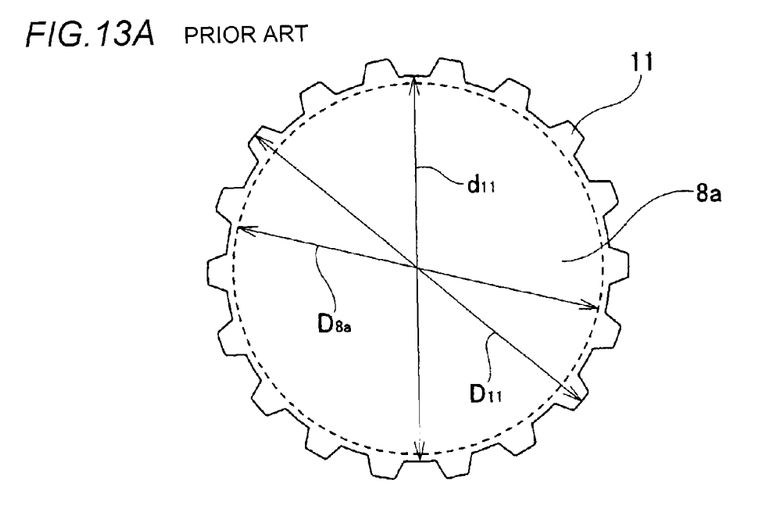
FIG. 13A is an end view illustrating a torque transmission shaft having a round rod shape, as seen from a left side of FIG. 12.
Figure 13B:
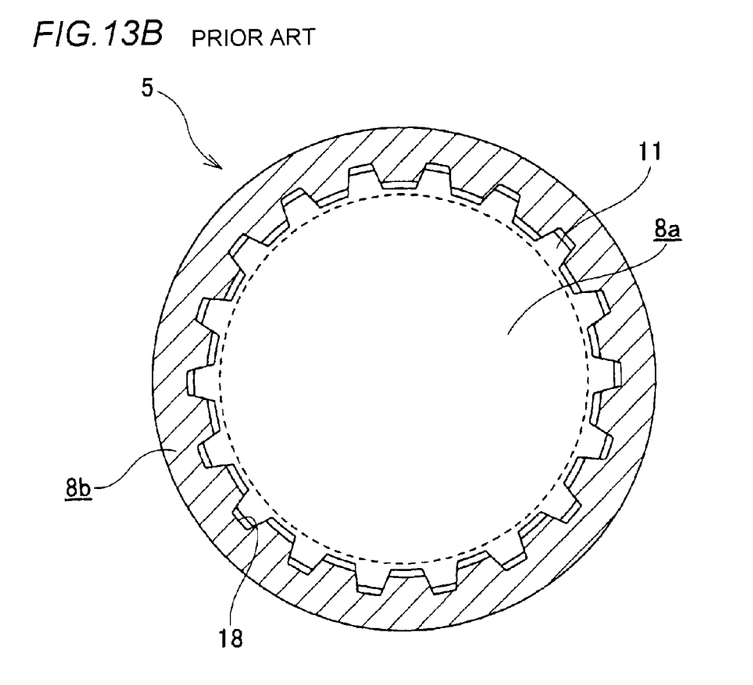
FIG. 13B is a sectional view illustrating a state where the torque transmission shaft is combined with another torque transmission shaft having a round tube shape.

The intermediate shaft 5 configuring the steering apparatus is required to have the function of expanding and contracting the entire length thereof, in addition to the function of transmitting the torque, as described above. The intermediate shaft 5 having those functions has been conventionally widely used (for example, refer to Patent Documents 1 and 2). FIGS. 12, 13A and 13B illustrate an example of the intermediate shaft 5 conventionally widely used. The intermediate shaft 5 has a pair of torque transmission shafts 8a, 8b having a round rod shape or round tube shape. Base end portions of yokes 9, 9 for configuring universal joints 4a, 4b are respectively coupled and fixed to axially outer end portions (base end portions at opposite sides) of the torque transmission shafts 8a, 8b. The universal joints 4a, 4b are respectively configured to couple other yokes 9a, 9b to tip portions of the yokes 9, 9 through cross shafts 10 so that the torque can be transmitted between the respective yokes 9, 9a, 9b even at a state where central axes of the yokes 9, 9a, 9b are inclined relative to each other.

A tip portion (a left end portion in FIG. 12) of the torque transmission shaft 8a having the round rod shape of the torque transmission shafts 8a, 8b configuring the intermediate shaft 5 is made to have a larger diameter than an intermediate part thereof and male spline teeth are formed on an outer periphery of the large diameter part, so that a male spline part 11 is provided on the outer periphery of the tip portion of the torque transmission shaft 8a. In this conventional structure, a groove bottom diameter $d_{11}$ of the male spline part 11 is made to be larger than an outer diameter $Dg_a$ of the intermediate part of the torque transmission shaft 8a ($d_{11} > D_{8a}$), so that the large diameter part can be formed with the male spline teeth by broach processing, which is a type of cutting processing. In contrast, an inner periphery of the torque transmission shaft 8b having the round tube shape is formed with female spline teeth over a substantial entire length of the inner periphery of the torque transmission shaft 8b, so that the substantial entire inner periphery of the torque transmission shaft 8b is formed as a female spline part 18.

As shown in FIG. 12, the male spline part 11 formed on the outer periphery of the tip portion of the torque transmission shaft 8a having the round rod shape is engaged with the female spline part 18 provided on the inner periphery of the torque transmission shaft 8b having the round tube shape, so that it is possible to obtain the intermediate shaft 5, of which an entire length can be expanded and contracted by the torque transmission shaft 8a and the torque transmission shaft 8b. In this case, when the spline parts 11, 18 are axially displaced by small force, it is possible to obtain the functions corresponding to the above (1) and (2). Likewise, when the spline parts are axially displaced by larger force to some extent, it is possible to obtain only the function corresponding to the above (2) (as the intermediate shaft 5 is contracted, the shock energy input from the front end portion of the intermediate shaft 5 upon the collision accident can be absorbed).

Figure 14A:
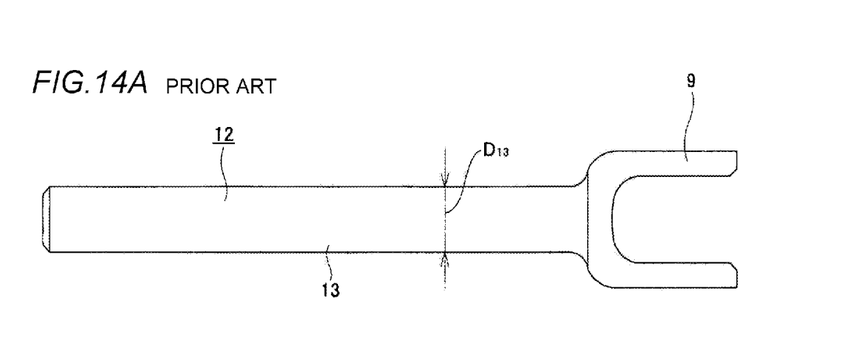
FIGS. 14A to 14C are side views illustrating processes of manufacturing a conventional torque transmission shaft having a universal joint yoke.
Figure 14B:
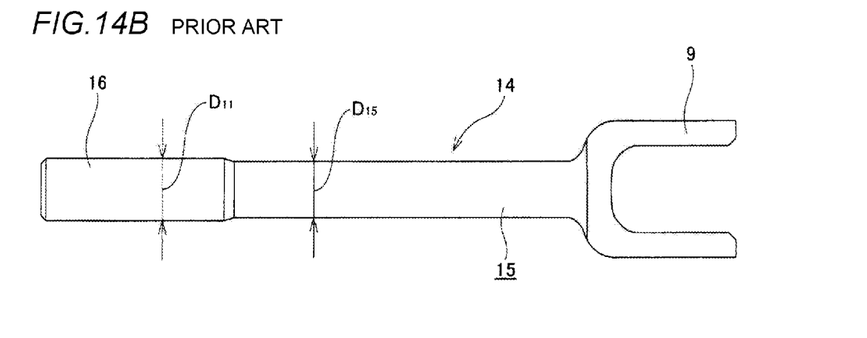
Figure 14C:
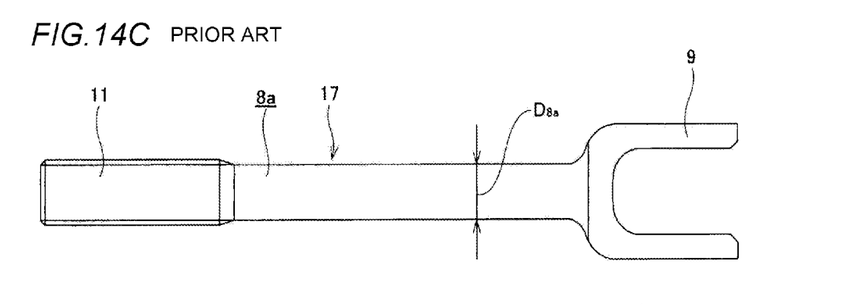

Regarding the respective members of the intermediate shaft 5 having the universal joints 4a, 4b provided at both end portions thereof, when the torque transmission shaft 8a having the round rod shape and the yoke 9 are integrally formed to obtain a torque transmission shaft having a universal joint yoke, it is not necessary to perform an operation of coupling and fixing the torque transmission shaft 8a and the yoke 9 by welding and like and it is possible to increase the strength of the coupling part, which are advantageous to the saving of the cost of the intermediate shaft 5 and the improvement on the strength thereof. FIGS. 14A to 14C illustrate an example of a conventional method of manufacturing a torque transmission shaft having a universal joint yoke, in which the torque transmission shaft 8a having the round rod shape and the yoke 9 are integrally formed.

According to the conventional manufacturing method, plastic working such as forge processing is performed for a hollow or solid metal material such as medium-carbon steel, so that a first intermediate material 12 as shown in FIG. 14A is obtained. One axial half part (a part except for the other axial end portion, a left part of FIGS. 14A to 14C) of the first intermediate material 12 is formed as a first base rod part 13 having an outer diameter $D_{13}$ which is constant over a substantial entire length, and a base end portion of the yoke 9 is fixed to the other axial end portion (a right end portion in FIGS. 14A to 14C) of the first base rod part 13, so that the first base rod part 13 and the yoke 9 are integrally formed. The outer diameter $D_{13}$ of the first base rod part 13 is larger than the outer diameter $D_{8a}$ of the intermediate part (the part axially distant from the male spline part 11 and the yoke 9) of the completed torque transmission shaft 8a having the round rod shape shown in FIGS. 12, 13A and 13B and is substantially the same as a tooth tip circle diameter (a circumscribed circle diameter) $D_{11}$ of the male spline part 11 ($D_{11} \approx D_{13} > D_{8a}$). The cutting processing such as turning machining is performed for the other axial end portion (an axially intermediate part of the first intermediate material 12) of the first base rod part 13, so that a second intermediate material 14 as shown in FIG. 14B is obtained. In the second intermediate material 14, an outer diameter $D_{15}$ of the other axial end portion (an axially intermediate part of the second intermediate material 14) of a second base rod part 15 provided at one axial half part thereof is made substantially the same as the outer diameter $D_{8a}$ ($D_{15} \approx D_{8a}$) of the intermediate part of the completed torque transmission shaft 8a having the round rod shape and one axial end portion is provided with a large diameter part 16 having an outer diameter which is larger than the other axial end portion. Then, an outer periphery of the larger diameter part 16 is formed with male spline teeth, so that the outer periphery of the corresponding part is provided with the male spline part 11. Thereby, a torque transmission shaft 17 having a universal joint yoke, in which the torque transmission shaft 8a having the round rod shape and the yoke 9 are integrally formed, is obtained.

According to the torque transmission shaft 17 having the universal joint yoke, it is not necessary to perform an operation of coupling and fixing the torque transmission shaft 8a and the yoke 9 by the welding and like and it is possible to increase the strength of the coupling part, which are advantageous to the saving of the cost of the intermediate shaft 5 and the improvement on the strength thereof, like the conventional structure shown in FIG. 12. However, it is necessary to perform the cutting processing such as turning machining for the other axial end portion of the first base rod part 13, so that the manufacturing cost of the torque transmission shaft 17 having the universal joint yoke is increased. Also, the groove bottom diameter $d_{11}$ of the male spline part 11 is increased beyond necessity, so that it is difficult to reduce a weight of the entire intermediate shaft 5 including the torque transmission shaft 17 having the universal joint yoke.

PRIOR ART DOCUMENT

Patent Document

Patent Document 1: JP-A-2001-182736
Patent Document 2: JP-A-2012-117560

SUMMARY OF THE INVENTION

Problem to be Solved

It is therefore an object of the present invention to provide a torque transmission shaft having a universal joint yoke and a manufacturing method thereof with which it is possible to save a manufacturing cost and to easily reduce a weight thereof.

Means for Solving the Problem

A torque transmission shaft having a universal joint yoke according to the present invention includes: a rod part which has a round rod shape and includes a male spline part provided on an outer periphery of one axial end portion thereof; and a yoke which is fixed to another axial end portion of the rod part and includes a pair of arm parts configured to pivotally support end portions of a cross shaft configuring a cross shaft type universal joint, wherein a groove bottom diameter of the male spline part is smaller than an outer diameter of a part of the rod part axially distant from the male spline part.

A surface of the male spline part may be provided with a coating layer made of a low friction material.

In the coating layer, a groove bottom layer formed on a groove bottom of the male spline part may have a diametrical thickness larger than a diametrical thickness of a tooth tip layer formed on a tooth tip portion of the male spline part.

A sectional shape of a spline groove of the male spline part may be a partial arc shape.

There is provided a telescopic shaft including the above torque transmission shaft having the universal joint yoke, and another torque transmission shaft which has a round tube shape at least at the other axial end portion and includes a female spline part formed on an inner periphery of the other axial end portion and configured to be spline-engaged with the male spline part, so that the torque can be transmitted between the torque transmission shaft having the universal joint yoke and the other torque transmission shaft, and the torque transmission shaft having the universal joint yoke can be relatively moved with the other torque transmission shaft. A part of the rod part axially distant from the male spline part may have an outer diameter smaller than an inscribed circle diameter of the female spline part of the other torque transmission shaft A method of manufacturing a torque transmission shaft having a universal joint yoke according to the present invention, in order to manufacture the above torque transmission shaft having the universal joint yoke, includes providing a rod-shaped element to which the yoke is fixed at another axial end portion thereof, an outer diameter of an axial half part of the rod-shaped element being the same as an outer diameter of the finished rod part at a side of the axial end portion thereof (a part of the rod part axially distant from the male spline part); and performing plastic working for deforming an outer periphery of one axial end portion of the rod-shaped element, on the outer periphery of the one axial end portion, thereby forming the male spline part on the outer periphery of the one axial end portion of the rod-shaped element such that the male spline part has a groove bottom diameter smaller than an outer diameter of the rod part at a side of the other axial end portion thereof and has a tooth tip diameter larger than the outer diameter of the rod part at the side of the other axial end portion thereof.

The plastic working may be forge processing of pressing a mold which has a processing surface of a shape conforming to an outer surface shape of the male spline part, to the outer periphery of the one axial end portion of the rod-shaped element.

A sectional shape of a spline groove of the male spline part may be a partial arc shape.

Incidentally, the term 'spline' described in the specification and the claims includes a general spline of which a circumferential pitch of teeth and grooves is larger, and also one referred to as serration of which a circumferential pitch of teeth is smaller.

Effects of the Invention

According to the torque transmission shaft having the universal joint yoke and the manufacturing method thereof as described above, it is possible to save the manufacturing cost and to easily reduce the weight thereof.

That is, according to the present invention, in order to form the male spline part on the outer periphery of one axial end portion of the rod-shaped element, one axial end portion is crushed diametrically inwards at the plurality of circumferential places, so that the plurality of spline groove portions, each of which extends axially, are formed. At the same time, the extra thicknesses extruded from the respective spline groove portions are projected (uphove) diametrically outwards between the circumferentially adjacent spline groove portions, so that the plurality of spline teeth, each of which extends axially, are formed between the respective spline groove portions. Therefore, it is not necessary to perform cutting processing such as turning machining for a part of the rod-shaped element becoming the rod part, so as to prevent the interference between tip portions of the spline teeth configuring the female spline part formed on the inner periphery of the other torque transmission shaft having the round tube shape and the outer periphery of the rod part of the torque transmission shaft having the universal joint yoke. For this reason, it is possible to save the manufacturing cost of the torque transmission shaft having the universal joint yoke. Also, since the male spline part is made by the plastic working, the hardness of the spline teeth configuring the male spline part is sufficiently increased by densification and work hardening of the metal material resulting from the plastic working. Therefore, even when the tooth tip circle diameter of the male spline part is not made to be particularly larger (even when a height of the spline teeth configuring the male spline part is made to be lower to some extent), it is possible to secure the sufficient strength of the spline engaging between the male spline part and the female spline part formed on the inner periphery of the other torque transmission shaft (it is possible to secure a capacity of the torque which can be transmitted by the torque transmission shaft having the universal joint yoke). For this reason, it is not necessary to enlarge the pitch circle diameter of the spline engaging portions of the male and female spline parts and the outer diameter (the groove bottom diameter and the tooth tip circle diameter) of the part, for which the spline engaging portions are provided, of the torque transmission shaft having the universal joint yoke, beyond necessity, so that it is easy to reduce weights of the torque transmission shaft having the universal joint yoke and a telescopic shaft such as the intermediate shaft including the torque transmission shaft having the universal joint yoke.

DETAILED DESCRIPTION OF EMBODIMENTS

[First Embodiment]

Figure 1:
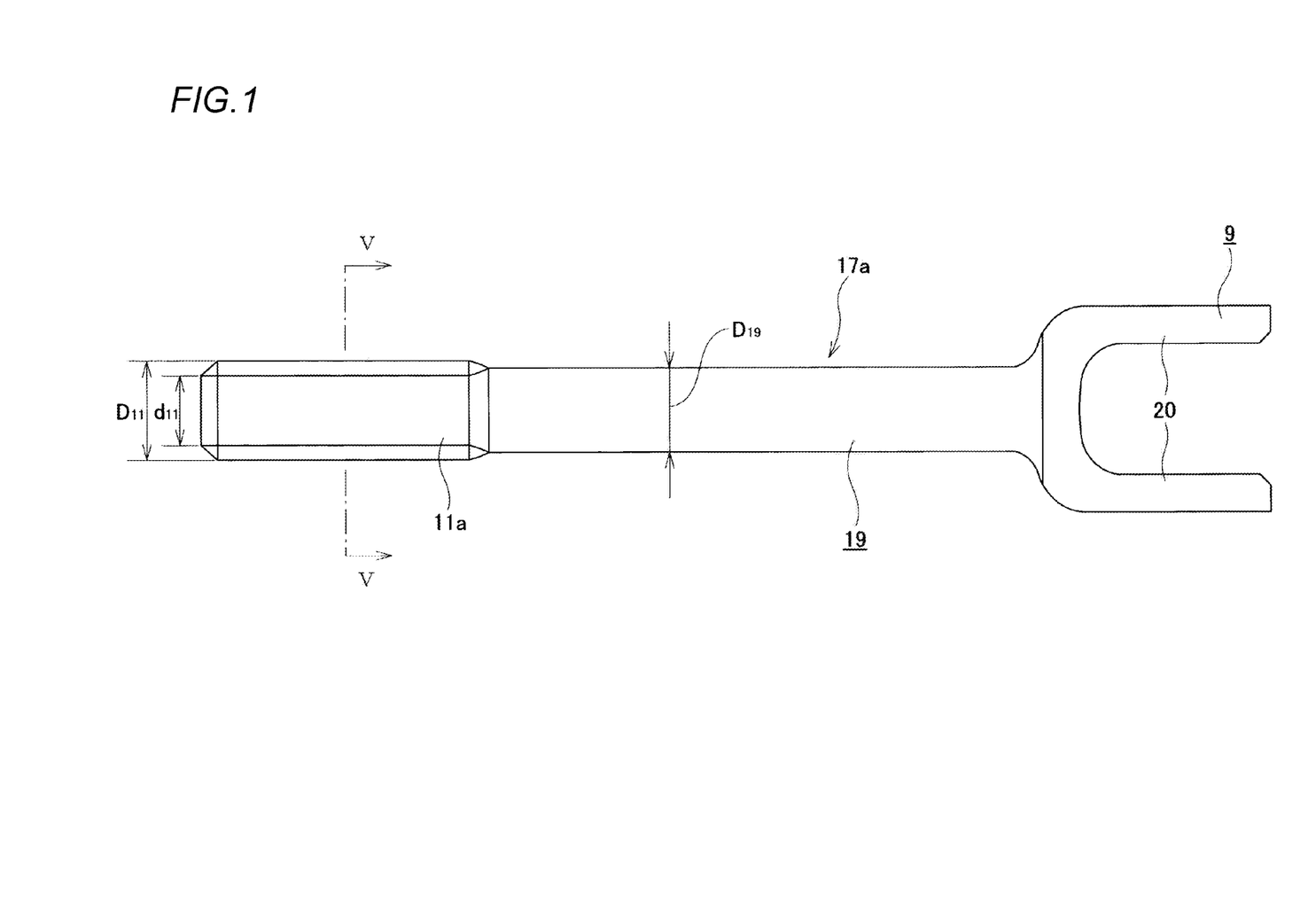
FIG. 1 is a side view of a torque transmission shaft having a universal joint yoke according to a first embodiment of the present invention.
Figure 2A:
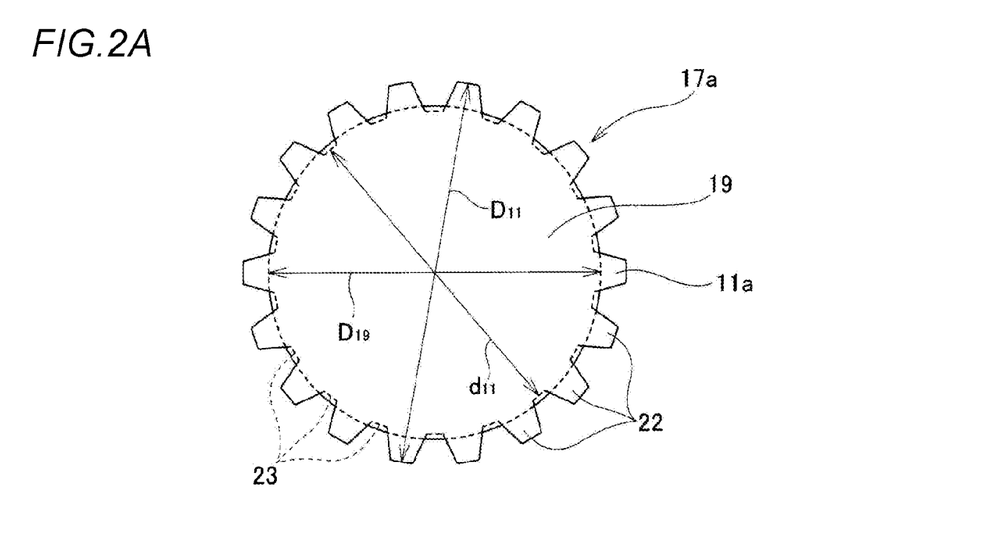
FIG. 2A is an end view illustrating a torque transmission shaft having the universal joint yoke, as seen from a left side of FIG. 1.
Figure 2B:
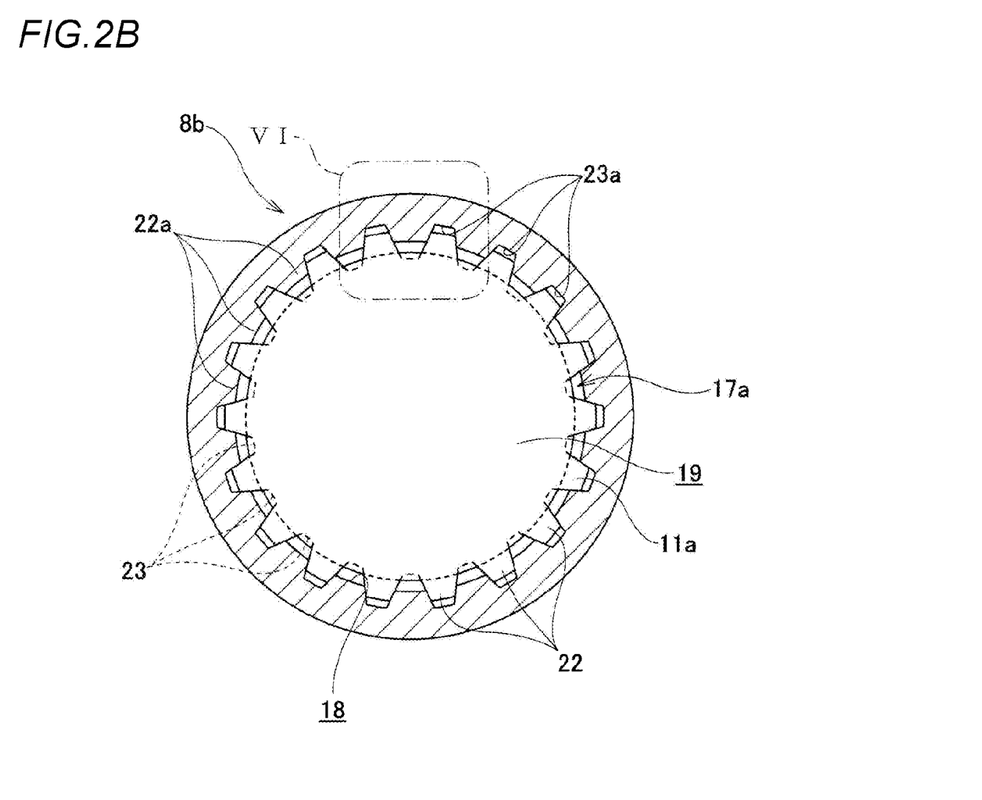
FIG. 2B is a sectional view illustrating a state where the torque transmission shaft having the universal joint yoke and another torque transmission shaft having a round tube shape are combined.

A first embodiment of the present invention will be described with reference to FIGS. 1 to 7. FIG. 1 illustrates a completed torque transmission shaft 17a having a universal joint yoke according to this embodiment. The torque transmission shaft 17a having the universal joint yoke is provided on an outer periphery of one axial end portion (a left end portion in FIG. 1) of a rod part 19 having a circular section with a male spline part 11a, and a base end portion of a yoke 9 having a pair of arm parts 20, 20 for pivotally supporting two end portions, which are diametrically opposite to each other, of four end portions of the cross shaft 10 (refer to FIG. 12) configuring the cross shaft-type universal joint 4a is fixed to the other axial end portion (a right end portion in FIG. 1) of the rod part 19. In particular, in the case of the torque transmission shaft 17a having the universal joint yoke of this embodiment, a groove bottom diameter $d_{11}$ of the male spline part 11a is made to be smaller than an outer diameter $D_{19}$ of the other axial end side part (a part of the rod part 19 axially distant from the male spline part 11a) of the rod part 19 ($d_{11} < D_{19}$). As shown in FIGS. 2B and 3C, the male spline part 11a of the torque transmission shaft 17a having the universal joint yoke is spline-engaged with a female spline part 18 provided on an inner periphery of the other torque transmission shaft 8b having a round tube shape. Thereby, the torque can be transmitted between the torque transmission shaft having the universal joint yoke and the other torque transmission shaft 8b, and the intermediate shaft (refer to FIGS. 11 to 13) of which axial size can be expanded and contracted is configured.

As shown in FIGS. 3A, 3B, 4A and 4B, the torque transmission shaft 17a having the universal joint yoke as described above is made by performing only plastic working for a hollow or solid rod-shaped metal material, in principle. That is, even though cutting processing and grinding processing may be performed for finishing, the cutting processing and grinding processing causing a shape and a size to be changed are not performed in principle, except for a chamfering of an end portion, for example. In this embodiment, in order to make the torque transmission shaft 17a having the universal joint yoke as described above, a rod-shaped element 21 as shown in FIGS. 3A and 4A is first made by performing the plastic working such as press working and forge processing for a metal material such as carbon steel and stainless steel. The base end portion of the yoke 9 is fixed to the other axial end portion of the rod-shaped element 21 and an outer diameter $D_{21}$ of one axial half part (a part except for the other axial end portion) thereof is made to be the same as an outer diameter $D_{19}$ of the completed rod part 19 ($D_{21}=D_{19}$). The plastic working for making the rod-shaped element 21 is the same as the plastic working for making the first intermediate material 12, except that the outer diameter $D_{21}$ of the rod-shaped element 21 is made to be smaller than the outer diameter $D_{13}$ of the first base rod part 13 of the conventional first intermediate material 12 shown in FIG. 14A and to be substantially the same as the outer diameter $D_{8a}$ of the intermediate part of the completed torque transmission shaft 8a shown in FIG. 14C ($D_{13} > D_{21} \approx D_{8a}$). Also, since the well-known method can be applied to a method of implementing the plastic working for making the rod-shaped element 21, the specific illustration and description thereof will be omitted.

Figure 3A:
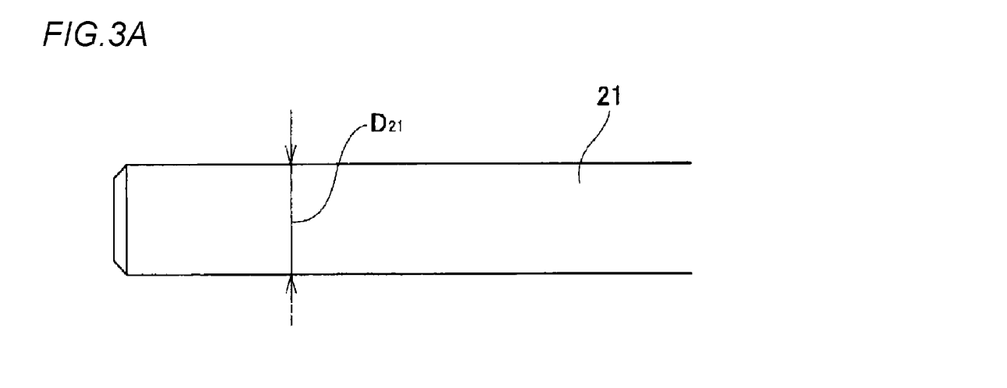
FIGS. 3A and 3B are partial side views illustrating a process of providing one axial end portion of a rod part with a male spline part so as to make the torque transmission shaft having the universal joint yoke.
Figure 3B:
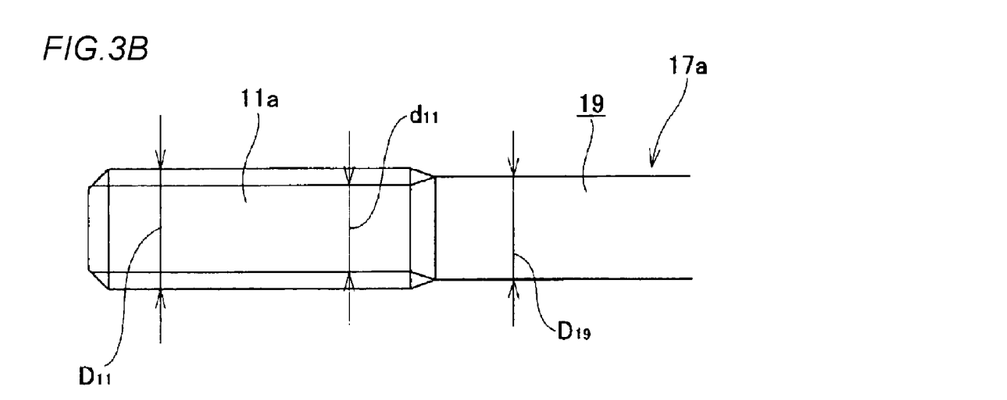
Figure 3C:
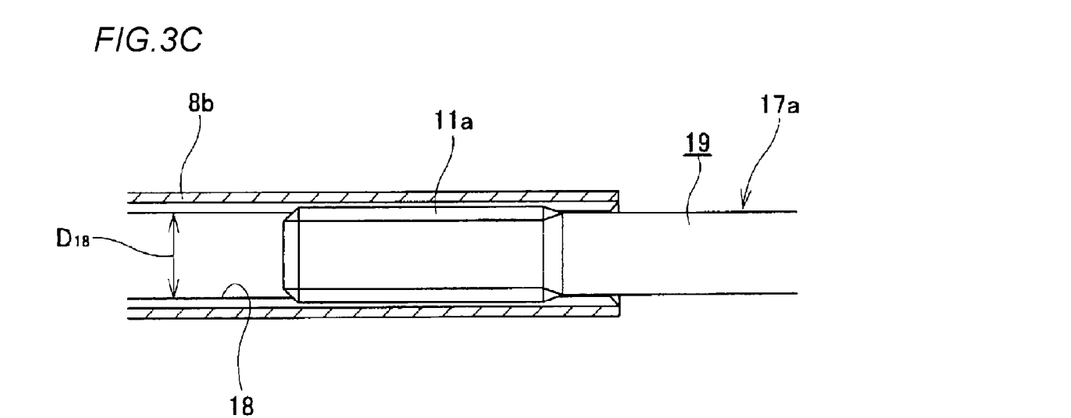
FIG. 3C is a partial sectional view illustrating a state where the male spline part is combined with a female spline part of the other torque transmission shaft.
Figure 4A:
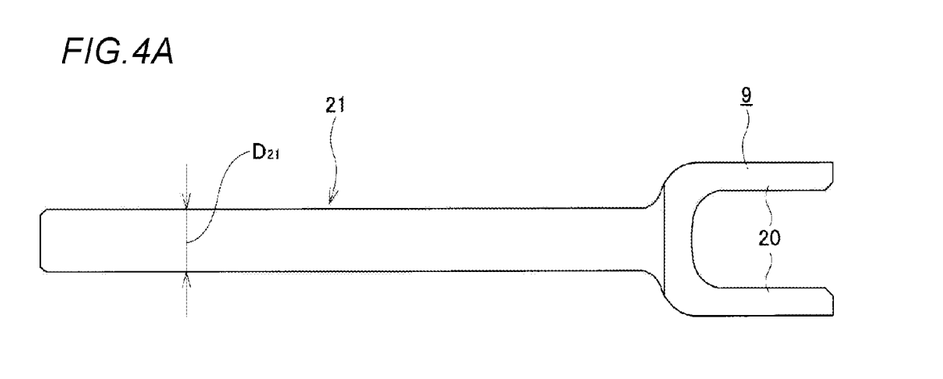
FIGS. 4A and 4B are side views illustrating the entire torque transmission shaft having the universal joint yoke at the same states as FIGS. 3A and 3B.
Figure 4B:
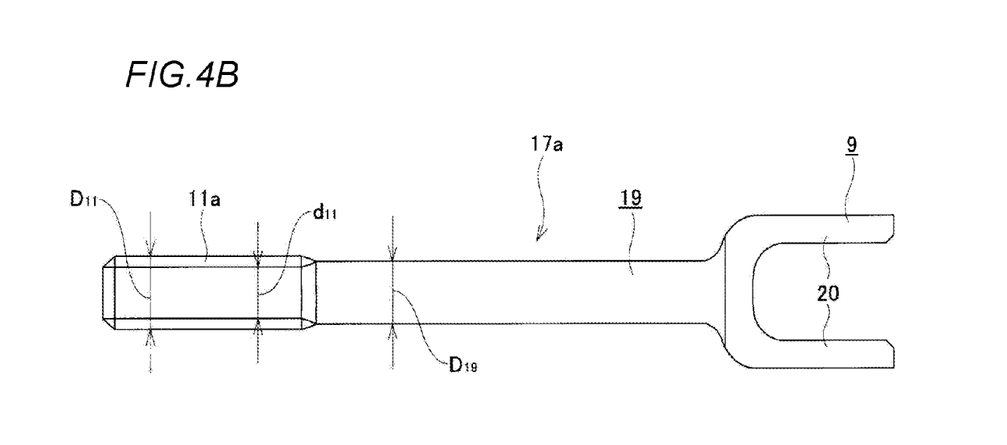

After the rod-shaped element 21 as described above is made, the plastic working for diametrically deforming an outer periphery of one axial end portion of the rod-shaped element 21 is performed for the outer periphery of one axial end portion, as shown in FIGS. 3A and 3B, so that the male spline part 11a is formed on the outer periphery of one axial end portion. As described above, the male spline part 11a is formed to have the groove bottom diameter $d_{11}$ smaller than the outer diameter $D_{19}$ of the rod part 19 ($d_{11} < D_{19}$) and to have a tooth tip diameter $D_{11}$ larger than the outer diameter $D_{19}$ of the rod part 19 ($d_{11} < D_{19} < D_{11}$). Also, the groove bottom diameter and the outer diameter $D_{19}$ of the rod part 19 are smaller than a tooth tip circle diameter (an inscribed circle diameter) $D_{18}$ of the female spline part 18 formed on the inner periphery of the other torque transmission shaft 8b having the round tube shape ($d_{11} < D_{19} < D_{18}$). Therefore, as described later, there is no interference between tooth tips of respective spline teeth 22a, 22a configuring the rod part 19 and the groove bottoms of the male spline part 11a or outer periphery of the rod part 19 at a state where the male spline part 11a and the female spline part 18 are spline-engaged.

Incidentally, during the plastic working for forming the male spline part 11a, the outer periphery of one axial end portion of the rod-shaped element 21 is crushed diametrically inwards at a plurality of circumferential places, so that a plurality of spline groove portions 23, 23, each of which extends axially, are formed. At the same time, extra thicknesses (metal material) extruded from the respective spline groove portions 23, 23 are moved towards between the respective circumferentially adjacent spline groove portions 23, 23 and respective portions therebetween are thus projected (bulged) diametrically outwards, so that a plurality of spline teeth 22, 22, each of which has an axially long bank shape, are formed. For this reason, any plastic working capable of denting circumferential portions diametrically inwards to form the spline groove portions 23, 23, each of which is axially long, and projecting the portions between the respective circumferentially adjacent spline groove portions 23, 23 diametrically outwards to form the spline teeth 22, 22, each of which is axially long, can be applied. For example, the press working, the forge processing, the rolling processing and the like can be adopted.

Regarding the plastic working, the forge processing, particularly, the cold forge processing is most preferable because it is possible to obtain the high size precision and shape precision and the male spline part 11a of high strength. When forming the male spline part 11a on the outer periphery of one axial end portion of the rod-shaped element 21 by the forge processing, one axial end portion of the rod-shaped element 21 is strongly axially pressed in a die, which is a type of a mold and has an inner surface shape conforming to (a concavo-convex shape is reverse to and the other basic shape coincides with) an outer surface shape of the male spline part 11a, the outer periphery of one axial end portion of the rod-shaped element 21 is pressed diametrically inwards over the axial direction at a plurality of circumferential places (actually, the diametrically outward bulging is suppressed) to form the respective spline groove portions 23, 23 and the portions between the respective circumferentially adjacent spline groove portions 23, 23 are projected (bulged) diametrically outwards to have a bank shape, so that the outer surface shape of one axial end portion is made to coincide with the inner surface shape of the die.

Figure 6:
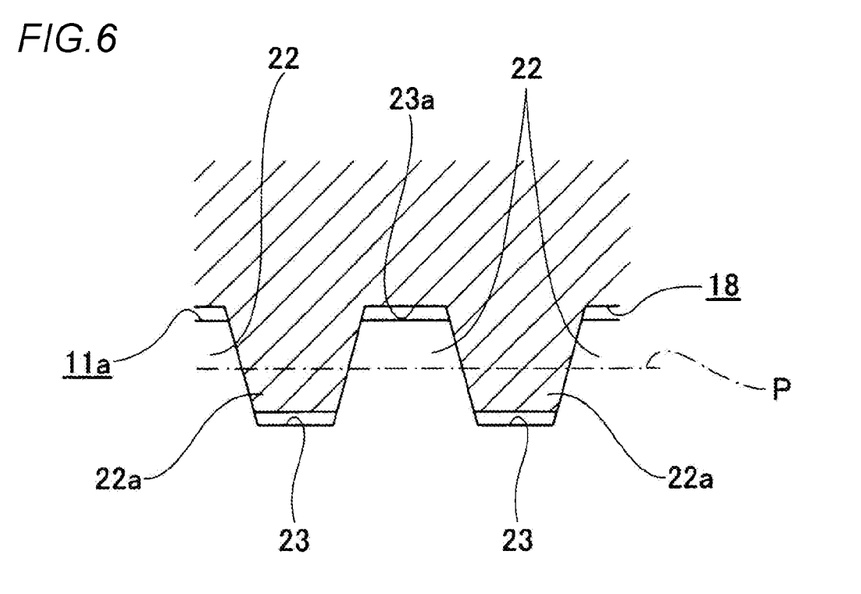
FIG. 6 is an enlarged sectional view corresponding to a VI part of FIG. 2B, which illustrates a relation between spline teeth configuring both male and female spline parts and a pitch circle diameter of spline engaging portions.
Figure 7:
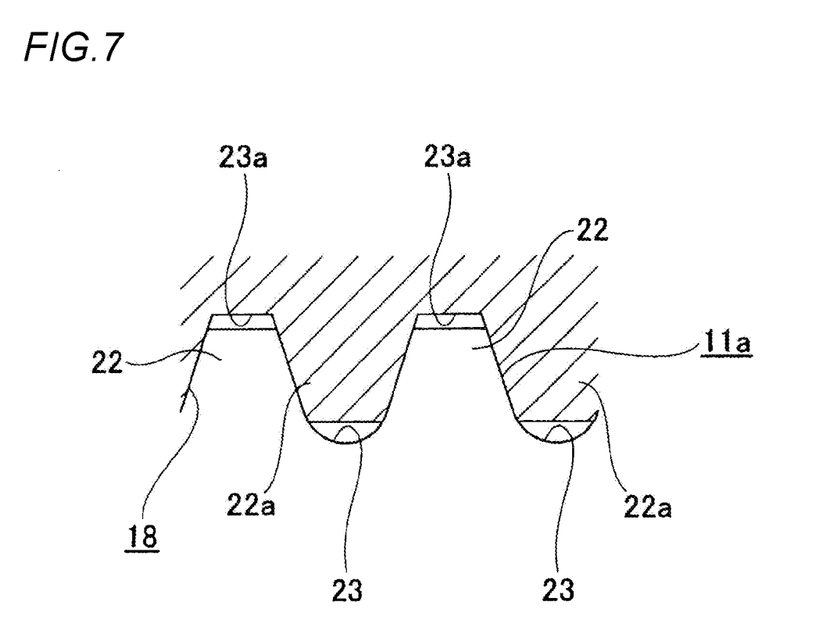
FIG. 7 is the same view as FIG. 6, which illustrates another shape of the spline teeth configuring the male spline part.

The torque transmission shaft 17a having the universal joint yoke, in which the male spline part 11a is integrally provided on the outer periphery of one axial end portion and the yoke 9 is integrally provided at the other axial end portion as described above, is spline-engaged at the male spline part 11a with the female spline part 18 formed on the inner periphery of the other torque transmission shaft 8b having the round tube shape, as shown in FIGS. 3C and 2B, so that the torque can be transmitted between the torque transmission shaft 17a and the other torque transmission shaft 8b and the intermediate shaft 5 of which axial size can be expanded and contracted is configured, as shown in FIGS. 11 and 12. At this state, the tooth tips of the respective spline teeth 22, 22 configuring the male spline part 11a are positioned at a diametrical outer side of a pitch circle P and the tooth tips of the respective spline teeth 22a, 22a configuring the female spline part 18 are positioned at a diametrical inner side of the pitch circle P, as shown in FIG. 6. For example, the respective spline teeth 22, 22a are located with the pitch circle P being interposed therebetween from both diametrical sides. Therefore, the stiffness of the engaged portions (spline engaging portions) between both spline parts 11a, 18 is increased, so that it is possible to transmit the high torque easily and stably by the intermediate shaft 5. Incidentally, when a sectional shape of the spline groove portions 23, 23 between the respective spline teeth 22, 22 configuring the male spline part 11a is formed to have a partial arc shape, as shown in FIG. 7, the stiffness of the spline teeth 22, 22 provided between the respective spline groove portions 23, 23 can be increased. As a result, it is possible to transmit the high torque more easily and stably by the intermediate shaft 5.

Figure 5A:
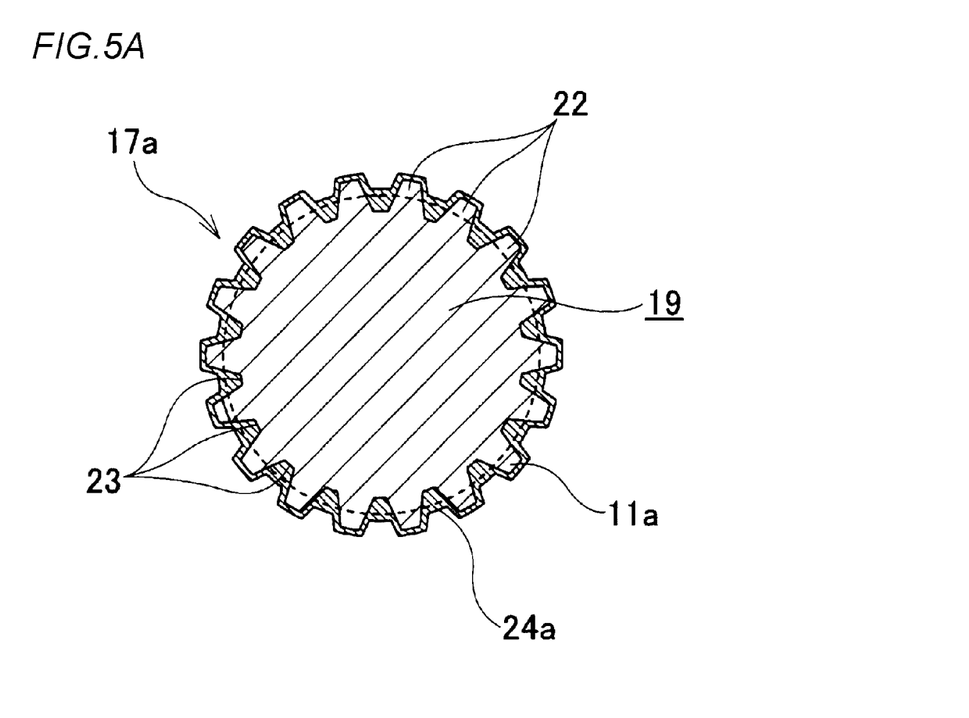
FIGS. 5A and 5B are enlarged sectional views taken along a V-V line of FIG. 1, which illustrate two examples of a structure where a coating layer made of a low friction material is provided for the male spline part.
Figure 5B:
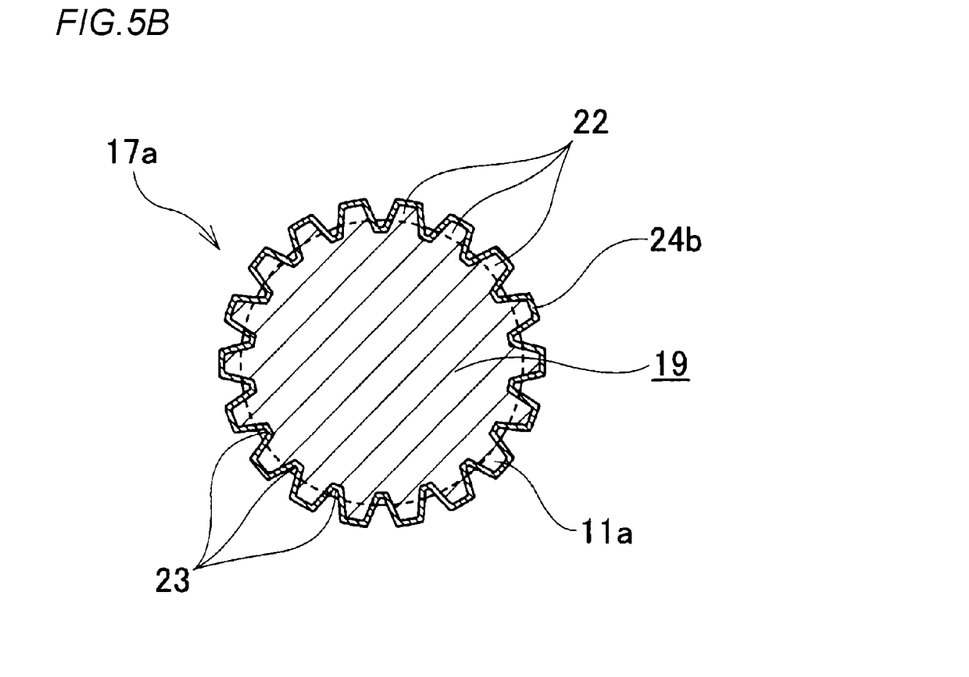

Incidentally, the spline engaging state (axial engaging strength) between the male spline part 11a and the female spline part 18 is appropriately adjusted by performance required for the intermediate shaft 5. In order to enable the spline parts to be axially displaced with small force so that the intermediate shaft 5 can smoothly adjust a position of a steering wheel in a front-rear direction, for example, a surface of the male spline part 11a may be provided with a coating layer 24a, 24b made of a low friction material for reducing an axial frictional resistance of the spline engaging portions with the female spline part 18, as shown in FIGS. 5A and 5B. As the low friction material for configuring the coating layer 24a, 24b, a variety of materials having required heat resistance and wear resistance can be used. However, for example, a solid lubricant such as molybdenum disulfide may also be used, in addition to a synthetic resin such as polyamide resin (PA), polyphenylenesulfide resin (PPS) and polyacetal resin (POM).

The coating layer 24a shown in FIG. 5A of the coating layers 24a, 24b is thickened at parts corresponding to bottoms of the respective spline groove portions 23, 23. Therefore, the female spline part 18 and the coating layer 24a are contacted or closely face each other over an entire surface at a state where the male spline part 11a and the female spline part 18 are spline-engaged. In contrast, the coating layer 24b shown in FIG. 5B is formed to be entirely thin, including parts corresponding to the bottoms of the respective spline groove portions 23, 23. Therefore, at the state where the male spline part 11a and the female spline part 18 are spline-engaged, there is a gap between the tooth tip portions of the female spline part 18 and the coating layer 24b.

In the gap, grease for lubricating the spline engaging portions between the male spline part 11a and the female spline part 18 may be collected, so that the lubricating state of the spline engaging portions by the grease can be favorably maintained for a long time.

According to the torque transmission shaft 17a having the universal joint yoke having the above configuration and manufactured as described above, it is possible to save the manufacturing cost of the torque transmission shaft 17a having the universal joint yoke and to easily reduce a weight of the torque transmission shaft 17a having the universal joint yoke.

That is, according to the manufacturing method of this embodiment, in order to form the male spline part 11a on the outer periphery of one axial end portion of the rod-shaped element 21, the outer periphery of one axial end portion is crushed diametrically inwards at the plurality of circumferential places, so that the plurality of spline groove portions 23, 23, each of which extends axially, are formed. At the same time, the extra thicknesses extruded from the respective spline groove portions 23, 23 are bulged diametrically outwards between the circumferentially adjacent spline groove portions 23, 23, so that the plurality of spline teeth 22, 22, each of which extends axially, are formed. Therefore, it is not necessary to perform the cutting processing such as turning machining for the intermediate part or base end portion of the rod-shaped element 21, which is a base rod part becoming the rod part 19, so as to prevent the interference between the tip portions of the spline teeth 22a, 22a configuring the female spline part 18 formed on the inner periphery of the other torque transmission shaft 8b having the round tube shape and the outer periphery of the rod part 19 of the torque transmission shaft 17a having a universal joint yoke. For this reason, it is possible to save the manufacturing cost of the torque transmission shaft 17a having the universal joint yoke.

Also, since the male spline part 11a is made by the plastic working, the hardness and toughness of the respective spline teeth 22, 22 configuring the male spline part 11a are not particularly lowered but are sufficiently increased by densification and work hardening of the metal material resulting from the plastic working. Therefore, even when the tooth tip circle diameter of the male spline part 11a is not made to be particularly large (even when the height of the respective spline teeth 22, 22 configuring the male spline part 11a is made to be lower to some extent), it is possible to secure the sufficient strength of the spline engaging between the male spline part 11a and the female spline part 18 formed on the inner periphery of the other torque transmission shaft 8b, and to secure a capacity of the torque which can be transmitted by the intermediate shaft 5 including the torque transmission shaft 17a having the universal joint yoke. For this reason, it is not necessary to enlarge the pitch circle diameter of the spline engaging portions of the male and female spline parts 11a, 18 and the outer diameter (the groove bottom diameter $d_{11}$ and the tooth tip circle diameter $D_{11}$) of the part, for which the spline engaging portions are provided, of the torque transmission shaft 17a having a universal joint yoke, beyond necessity, so that it is easy to reduce weights of the torque transmission shaft 17a having the universal joint yoke and the intermediate shaft 5 including the torque transmission shaft 17a having the universal joint yoke.

[Second Embodiment]

Figure 8:
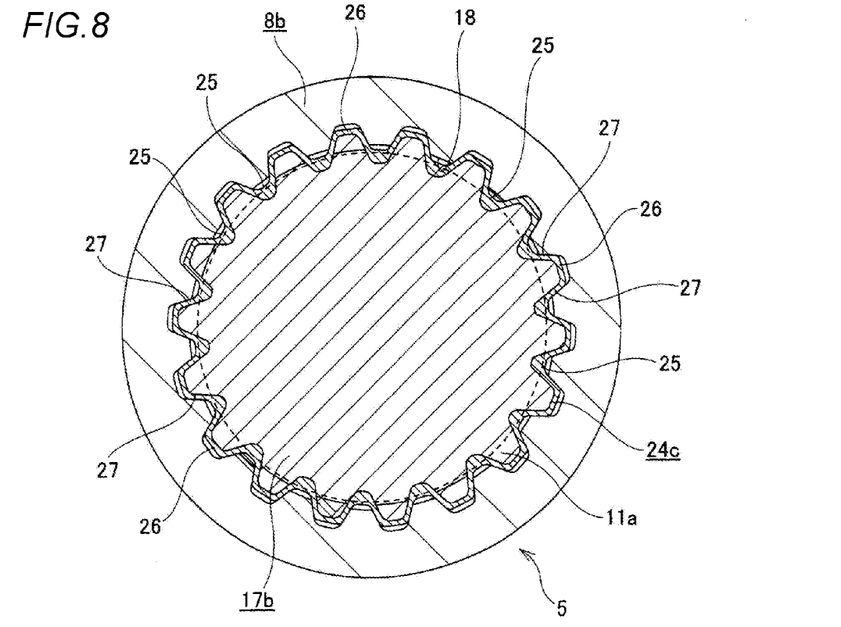
FIG. 8 is the same view as FIG. 2B, which illustrates a second embodiment of the present invention.
Figure 9:
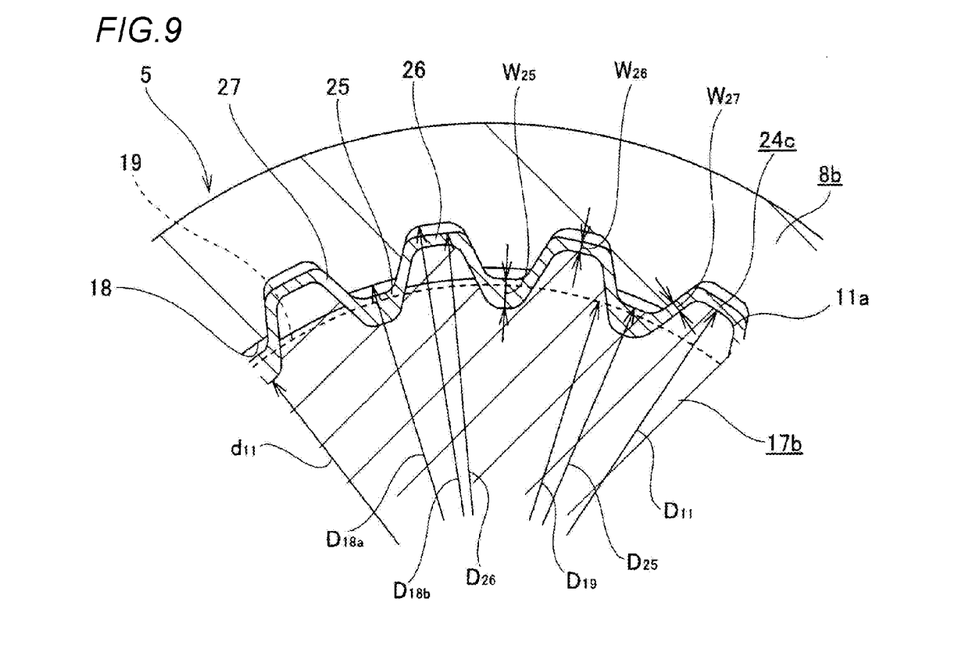
FIG. 9 is the same view as FIG. 6, which illustrates the second embodiment of the present invention.

A second embodiment of the present invention is described with reference to FIGS. 8 and 9. FIG. 8 illustrates the intermediate shaft 5 configured by combining a torque transmission shaft 17b having a universal joint yoke of this embodiment and the torque transmission shaft 8b. Incidentally, the torque transmission shaft 17b having the universal joint yoke of this embodiment is characterized in a structure of a coating layer 24c made of a low friction material and provided on the surface of the male spline part 11a. Since the other structures and manufacturing method are the same as those of the torque transmission shaft 17a having the universal joint yoke of the first embodiment, the structure of the coating layer 24c is focused in the below descriptions.

In this embodiment, the coating layer 24c is formed over the entire length and entire circumference of the male spline part 11a. A thickness size $W_{25}$ of groove bottom layers 25, 25 of the coating layer 24c, which are formed on the groove bottom of the male spline part 11a, in the diametrical direction (a direction orthogonal to a groove bottom surface) is larger than a thickness size $W_{26}$ of tooth tip layers 26, 26 in the diametrical direction (a direction orthogonal to the tooth tip) formed on the tooth tip portions of the male spline part 11a ($W_{25}>W_{26}$). Specifically, the thickness size $W_{25}$ of each groove bottom layer 25, 25 is set to be twice to three times as large as the thickness size $W_{26}$ of each tooth tip layer 26, 26 ($W_{25}=(2$ to $3)\times W_{26}$). Incidentally, a thickness size $W_{27}$ of a side surface layer 27 of the coating layer 24c, which is formed on a circumferential side surface of each spline tooth of the male spline part 11a, in a direction orthogonal to the circumferential side surface is the same as the thickness size $W_{26}$ of each tooth tip layer 26, 26 ($W_{27}=W_{26}$).

Also, an outer diameter size $D_{25}$ of each groove bottom layer 25, 25 is larger than an outer diameter size $D_{19}$ of the rod part 19 ($D_{25}>D_{19}$). Also, as shown in FIGS. 8 and 9, at the state where the intermediate shaft 5 is configured, a gap for collecting grease is formed between the outer periphery of each groove bottom layer 25, 25 and a tooth tip surface of the female spline tooth of the female spline part 18 configuring the torque transmission shaft 8b and between the outer periphery of each tooth tip layer 26, 26 and the groove bottom surface of the female spline part 18. That is, the outer diameter size $D_{25}$ of each groove bottom layer 25, 25 is smaller than a tooth tip circle (an inscribed circle) diameter $D_{18a}$ of the female spline part 18 ($D_{25}<D_{18a}$). Also, an outer diameter size $D_{26}$ of each tooth tip layer 26, 26 is smaller than a groove bottom circle diameter $D_{18b}$ of the female spline part 18 ($D_{26}<D_{18b}$).

A part of the torque transmission shaft 17b having the universal joint yoke of this embodiment except for the coating layer 24c is made by the same manufacturing method as the first embodiment. According to the torque transmission shaft 17b having the universal joint yoke made by the manufacturing method of the present invention, the groove bottom diameter $d_{11}$ of the male spline part 11a is smaller than the outer diameter $D_{19}$ of the rod part 19 ($d_{11}<D_{19}$), and the tooth tip diameter $D_{11}$ is larger than the outer diameter $D_{19}$ of the rod part 19 ($d_{11}<D_{19}<D_{11}$) due to the distinguishing manufacturing process. Therefore, at a state where the coating layer 24c is not provided, a space (gap) between the groove bottom surface of the male spline part 11a and the tooth tip surface of the female spline part 18 is increased, as shown in FIG. 2, for example. The space preferably has a certain level of size so as to collect the grease therein. However, if the space is excessively large, a vibration suppression effect (damping effect) by the grease present in the space is deteriorated, so that the vibrations occurring at the axial expansion and contraction of the intermediate shaft 5 are transmitted to the steering wheel and the driver may feel uncomfortable.

However, in this embodiment, the thickness relation between the respective groove bottom layers 25, 25 of the coating layer 24c and the respective tooth tip layers 26, 26 is adjusted as described above. For this reason, it is possible to make the space small and to adjust the same to an appropriate size by the respective groove bottom layers 25, 25. As a result, it is possible to improve the vibration suppression effect (damping effect) by the grease filled in the space. The other structures, operations and effects are the same as the first embodiment.

In the meantime, the present invention is not limited to the above embodiments and can be appropriately modified and/or improved.

For example, regarding the plastic working for forming the male spline part of the present invention, any plastic working capable of denting circumferential portions of one axial end portion of a rod-shaped element diametrically inwards to form spline groove portions, each of which extends axially, and projecting (bulging) portions between the circumferentially adjacent spline groove portions diametrically outwards to form spline teeth, each of which extends axially, can be applied. For example, the press working, the forge processing, the rolling processing and the like can be adopted. According to the press working, one axial end portion of the rod-shaped element is compressed diametrically between a plurality of molds configured to be diametrically displaced (perspective movement). Thereby, a concavo-convex shape formed on an inner periphery, which is a processing surface of each mold, is transferred to an outer periphery of one axial end portion of the rod-shaped element, so that the male spline part is formed.

Also, according to the forge processing, one axial end portion of the rod-shaped element is strongly axially pressed in a die, which is a type of a mold and has an inner surface shape conforming to (a concavo-convex shape is reverse to and the other basic shape coincides with) an outer surface shape of the male spline part. Thereby, one axial end portion of the rod-shaped element is bulged diametrically outwards to make the outer surface shape of one axial end portion coincide with the inner surface shape of the die.

Also, according to the rolling processing, one axial end portion of the rod-shaped element is strongly sandwiched between a pair of rack-shaped press dies each of which is a mold and is formed on each of side surfaces thereof facing each other with teeth conforming to the outer surface shape of the male spline part. At this state, both press dies are reciprocally displaced in a direction along which the respective teeth are arranged. Thereby, the shape of the teeth formed on both the press dies is transferred to the outer periphery of one axial end portion of the rod-shaped element, so that the male spline part is formed.

The present application is based on Japanese Patent Application No. 2013-157518 filed on Jul. 30, 2013 and Japanese Patent Application No. 2014-050230 filed on Mar. 13, 2014, the contents of which are here incorporated by reference.

INDUSTRIAL APPLICABILITY

Figure 10:
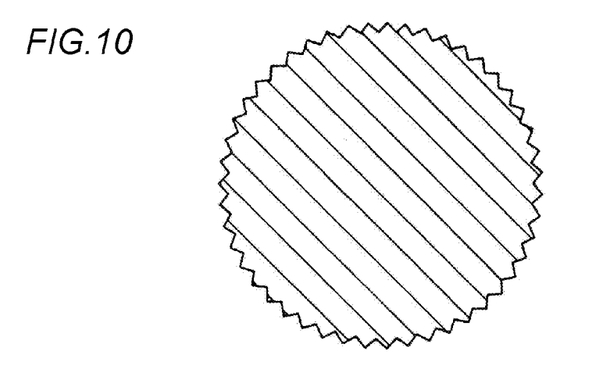
FIG. 10 is a view corresponding to the enlarged V-V sectional view of FIG. 1, which illustrates a sectional shape of a male serration, which is a type of the male spline part.

In the above descriptions, the present invention is applied to the intermediate shaft which configures the automobile steering apparatus and is configured to transmit the rotation of the steering shaft to the input shaft of a steering gear unit. However, the present invention can also be applied to a variety of torque transmission shafts in which a cross shaft type universal joint is provided at an end portion and spline engaging portions are provided at an intermediate part. Also, when the torque to be transmitted is not so high, the engaging portions of the torque transmission shaft having the round rod shape and the torque transmission shaft having the round tube shape may also be made by serrations having a fine pitch, as shown in FIG. 10.

DESCRIPTION OF REFERENCE NUMERALS

1: steering wheel
2: steering gear unit
3: steering shaft
4a, 4b: universal joint
5: intermediate shaft 6: input shaft
7: tie rod
8a, 8b: torque transmission shaft
9, 9a, 9b: yoke
10: cross shaft
11, 11a: mail spline part
12: first intermediate material
13: first base rod part
14: second intermediate material
15: second base rod part
16: large diameter part
17a, 17b: torque transmission shaft having a universal joint yoke
18: female spline part
19: rod part
20: arm part
21: rod-shaped element
22, 22a: spline tooth
23, 23a: spline groove portion
24a, 24b: coating layer
25: groove bottom layer
26: tooth tip layer
27: side surface layer

The invention claimed is:

1. A torque transmission shaft having a universal joint yoke, the torque transmission shaft comprising:
   a rod part which has a round rod shape and includes a male spline part provided on an outer periphery of a first axial end portion thereof; and
   a yoke which is fixed to a second, opposite, axial end portion of the rod part and includes a pair of arm parts configured to pivotally support end portions of a cross shaft configuring a cross shaft type universal joint,
   wherein a groove bottom diameter of the male spline part is smaller than an outer diameter of a part of the rod part axially distant from the male spline part,
   wherein a surface of the male spline part is provided with a coating layer made of a low friction material,
   wherein in the coating layer, a groove bottom layer formed on each of all groove bottoms of the male spline part has a diametrical thickness larger than a diametrical thickness of a tooth tip layer formed on each of all tooth tip portions of the male spline part.

2. The torque transmission shaft having the universal joint yoke according to claim 1,
   wherein a sectional shape of a spline groove of the male spline part is a partial arc shape.

3. A telescopic shaft comprising:
   the torque transmission shaft having the universal joint yoke according to claim 1, and
   another torque transmission shaft which has a round tube shape at least at one axial end portion and includes a female spline part formed on an inner periphery of said one axial end portion and configured to be spline-engaged with the male spline part,
   wherein a part of the rod part axially distant from the male spline part has an outer diameter smaller than an inscribed circle diameter of the female spline part of the other torque transmission shaft.

* * * * *